June 27, 1950         J. E. JONES         2,512,944
DIRECT-CURRENT MOTOR CONTROL
Filed Aug. 23, 1947

Inventor
Jesse E. Jones
By Frank V. Hubbard
Attorney

Patented June 27, 1950

2,512,944

UNITED STATES PATENT OFFICE 2,512,944

DIRECT-CURRENT MOTOR CONTROL

Jesse E. Jones, Wauwatosa, Wis., assignor to Cutler-Hammer, Inc., Milwaukee, Wis., a corporation of Delaware Application August 23, 1947, Serial No. 770,215

9 Claims. (Cl. 318—6)

1

This invention relates to direct current motor control and is especially applicable to and advantageous for motor driven apparatus used for winding strip or sheet material or wire or similar material into roll form where it is important to maintain the material under constant tension and where the increase in diameter of the roll tends to cause variation in tension.

Heretofore it has been customary to employ for drive of such apparatus a shunt wound direct current motor maintaining constant armature voltage and varying the excitation of the motor shunt field to compensate for change in diameter of the roll being formed. However, this limits to the speed range of the available shunt wound motors the permissible change in diameter of the roll, and as the speed range of such available motors is limited to a maximum of 6:1, the ratio of a full roll diameter to mandrel or bobbin diameter has been correspondingly limited. Moreover the wide speed range motors available are expensive and the required control is quite complicated and expensive, wherefore there has long existed a demand for a simpler and less expensive equipment for the purposes stated.

An object of the present invention is to provide for the purposes set forth satisfactory equipment materially simpler and less expensive than that heretofore employed.

Another object is to provide equipment suited to a materially wider variation in roll diameter than is the now employed equipment aforementioned.

Another object is to enable a series wound motor to be employed in lieu of a shunt wound motor.

According to the present invention it is proposed to employ preferably a series wound motor and to vary the voltage to which it is subjected, thereby to maintain the wattage input to the motor constant to maintain the tension constant as the diameter of the roll increases over a range greater than that for which the adjustable speed shunt motor will afford compensation.

The accompanying drawing diagrammatically illustrates an embodiment of the invention which will now be described, it being understood that the embodiment illustrated is susceptible of various modifications without departing from the scope of the appended claims.

Figure 1:
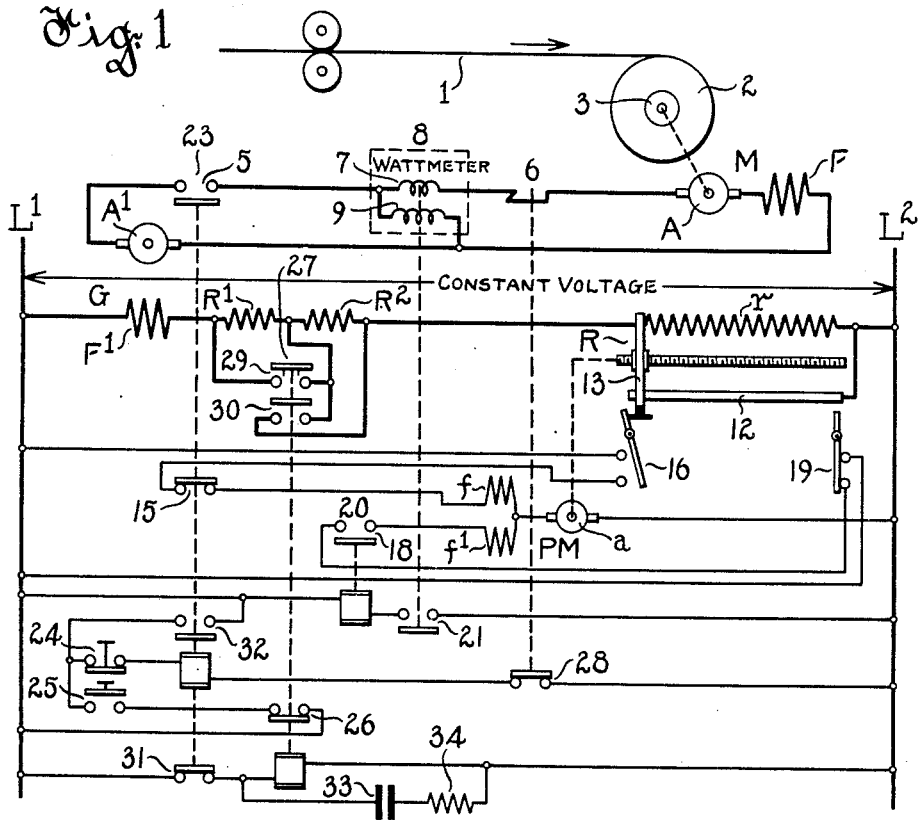
Figure 1 is a diagrammatic showing of a winder and control therefor.

Referring to Fig. 1, the same shows strip material 1 being wound into a roll 2 on a mandrel 3 driven by a motor M through suitable connections indicated by a broken line.

The motor M comprises an armature A and a series field winding F, said motor having its armature and field in a closed loop with the armature $A^1$ of a generator G, said generator having separately excited shunt field winding $F^1$.

The loop including the motor and generator armature includes normally disengaged contacts 5 of an electromagnetic switch hereinafter referred to, a winding 6 for an overload relay and a winding 7 for a wattmeter type of relay 8. The winding 7 constitutes the current winding of relay 8 and said relay has a voltage winding 9 connected across the aforementioned loop.

The generator field winding $F^1$ is connected across a constant voltage supply circuit $L^1$, $L^2$ through a rheostat R and through series resistors $R^1$ and $R^2$ which are utilized in acceleration as hereinafter set forth. As will be understood, the rheostat R provides for variation of the generator field strength to render the generator a source of adjustable voltage for the motor M assuming the generator armature to be driven by any suitable prime mover not shown.

The rheostat R is shown as comprising a resistor $r$ and a contact strip 12 which are bridged by a crosshead 13 to be driven by a pilot motor PM. The pilot motor PM has an armature $a$ and oppositely wound series field windings $f$ and $f^1$. As will be understood, the field windings $f$ and $f^1$ are energizable selectively to effect operation of the armature $a$ and consequent operation of the rheostat crosshead in reverse directions selectively.

The armature of the pilot motor and the field winding $f$ are adapted to be connected across lines $L^1$, $L^2$ by normally engaged switch contacts 15 and a normally closed limit switch 16 associated with the rheostat R. The limit switch 16 is adapted to open upon movement of the crosshead 13 to its left hand limit and to reclose upon movement of said rheostat crosshead out of such limit. The normally closed contacts 15 are contacts of the electromagnetic switch comprising also the contacts 5 in the motor generator loop. The pilot motor armature and field $f^1$ are adapted to be connected across lines $L^1$, $L^2$ by normally disengaged switch contacts 18 and a second limit switch 19 associated with rheostat R. Limit switch 19 is normally closed and is adapted to be opened upon movement of the crosshead 13 to its right hand limit, whereas it recloses upon movement of said crosshead out of such limit. The contacts 18 are contacts of an electroresponsive relay 20 which is under the control of contacts 21 of wattmeter relay 8, as hereinafter set forth.

The electroresponsive switch comprising the switch contacts 5 and 15 is designated as 23 and is under the control of a normally closed push button switch 24, a normally open push button switch 25 and contacts 26 of a relay 27 provided to control the generator field resistors $R^1$ and $R^2$. Also the switch 23 is under the control of normally engaged contacts 28 of the overload relay comprising winding 6. The switch 23 has normally engaged contacts 31 which connect the winding of relay 27 across lines $L^1$, $L^2$, thus normally energizing said relay to engage contacts 26 as shown. Thus closure of push button switch 25 provides for connection of the winding of switch 23 across lines $L^1$, $L^2$, said winding being connected to line $L^1$ through switches 24, 25 and 26, and to line $L^2$ through overload relay contacts 28. Switch 23 also has normally disengaged contacts 32 which upon response of said switch engage to establish a maintaining connection for the winding of switch 23, said connection extending from said winding to line $L^1$ through switch 24 and contacts 32.

Relay 27 has normally engaged sets of contacts 29 and 30 which shunt the generator field resistors $R^1$ and $R^2$, respectively. When relay 27 is energized contacts 29 and 30 interrupt the resistance shunts and when said relay is deenergized contacts 29 and 30 short-circuit resistors $R^1$ and $R^2$ sequentially. The winding of relay 27 is shunted by a condenser 33 and resistor 34 to afford said relay a time element incident to release when its energizing circuit is opened by contacts 31 of switch 23.

Assuming switch contacts 26 and 28 to be engaged as shown, switch 23 may be energized to complete the loop of the motor and generator by depressing push button switch 25 to energize switch 23. Thus if the generator is in operation the motor will be subjected to voltage the value of which is determined by the generator field strength. As switch 23 can only be energized when relay 27 is energized to engage contacts 26 and to disengage contacts 29 and 30 as illustrated, it will be observed that resistors $R^1$ and $R^2$ will be initially included in the generator field circuit. Then when switch 23 responds relay 27 drops subject to its aforementioned time element to short-circuit first resistor $R^1$ and then resistor $R^2$ to increase the field strength of the generator as the motor M accelerates.

Then assuming the electrical conditions in the loop of the motor and generator during or following starting of the motor to be such as to cause the wattmeter relay 8 to engage contacts 21 field weakening of the generator by rheostat R is effected. More particularly, contacts 21 connect across lines $L^1$, $L^2$ the winding of relay 20 and said relay in responding engages its contacts 18 to connect the pilot motor PM inclusive of its field winding $f^1$ across lines $L^1$, $L^2$ through the limit switch 19. The pilot motor PM thus drives the rheostat R to gradually insert resistor $r$ in the circuit of generator field winding $F^1$ until the wattage input to the motor is reduced to a predetermined value determined by the calibration of relay 8, whereupon said relay disengages its contacts 21 to deenergize relay 20 and thus stop the pilot motor. However, as the roll 2 increases in size the relay 8 responds from time to time for further operation of the pilot motor in the same direction thereby to maintain constant wattage input to the motor throughout a wide range of increase in diameter of the roll.

When switch 23 is energized to start motor M as above set forth it remains energized independently of push button switch 25. As aforedescribed, switch 23 through its contacts 32 establishes for itself a maintaining circuit which circuit remains effective pending failure of power or opening of the stop switch 24 or contacts 28 of the overload relay. Also switch 23 in responding disengages its contacts 15 to prevent reverse operation of the pilot motor PM and disengages its contacts 31 to interrupt the energizing circuit of relay 27 which releases only after lapse of a given period of time. When relay 27 releases it can only be reset after release of switch 23, and release of switch 23 by reengaging its contacts 15 provides for energizing the pilot motor PM for return of the rheostat R to the position shown.

Figure 2:
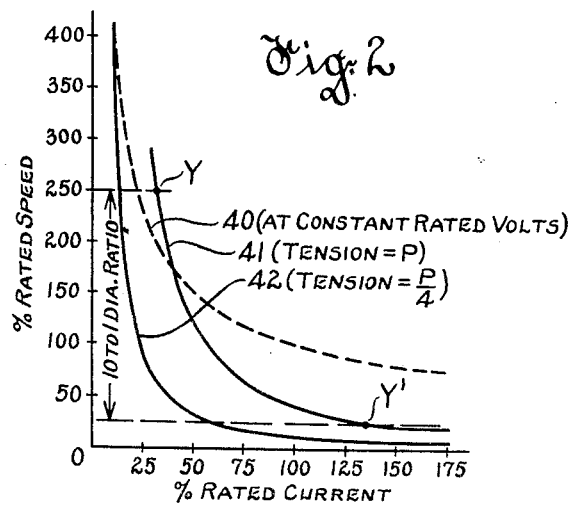
Fig. 2 depicts certain characteristic curves.

Referring to Fig. 2, the same shows a typical speed-current curve 40 for a standard direct current series motor supplied from a constant voltage direct current circuit. Curve 41 depicts the change in characteristics produced by constant wattage input of such value as to produce constant tension of magnitude P, while curve 42 depicts the change for a tension of P/4. A roll diameter range of 10:1 is indicated as a feasible operating range between the tension limits illustrated. Referring to curve 40, it will be noted that at point Y' more than rated current is drawn, whereas at point Y the voltage exceeds rated voltage, but that in the first case the voltage is low, whereas in the second case the current is low. Thus it seemingly is possible to extend these curves even further beyond rated conditions because the extreme conditions prevail only during a small part of the time required for winding a full roll. As depicted in Fig. 2, the motor is operated only up to 40% rating, but it would be possible to operate at much nearer its full load rating under other operating conditions such as different speed range and tension range.

It is, of course, to be understood that while for illustration an adjustable voltage generator was selected as the source of power for motor M, and selection was made of contacts operated by a wattmeter for control purposes, it is contemplated that other means may be employed in lieu thereof. As will be apparent especially if a high degree of sensitivity is desired, electronic means become self-suggestive for supplying power to the motor while a light beam under the control of a wattmeter becomes self-suggestive as a control medium. Also it is to be understood that while it is preferred to employ a winder motor of the series type the present proposal does not preclude use of a shunt type motor operating at constant shunt field values or an adjustable speed shunt motor having its shunt field varied during winding of a roll, but such a motor would have to operate at a small percentage of its rating, the percentage depending upon the ratio of diameter change of the roll.

An additional advantage of the instant winder system is that it constitutes a self-contained unit which does not require elaborate tie-in with the processing machine ahead of it in contrast to present winders requiring electrical coupling with the associated machinery. The instant system merely requires feed of material thereto at a uniform speed and it can be used in connection with an alternating current driven processing machine.

What I claim as new and desire to secure by Letters Patent is:

1. The combination with winding apparatus including a direct current driving motor, for winding material into roll form, of an electric power source supplying said motor, and control means sensitive to changes from a predetermined value in the wattage input of said motor to vary the voltage impressed upon the armature of said motor, said means comprising means rendering it effective to maintain the wattage input to said motor substantially constant as the diameter of the roll of material increases over a wide range.

2. The combination with winding apparatus including a direct current driving motor of the series wound type, for winding material into roll form, of an electrical power source supplying said motor, and control means sensitive to changes from a predetermined value in the wattage input of said motor to vary the voltage impressed upon said motor, said means comprising means rendering it effective to maintain the wattage input to said motor substantially constant as the diameter of the roll of material increases.

3. The combination with a direct current electric motor for driving winding apparatus or the like, of an electric power source for supplying said motor, and means for maintaining substantially constant the wattage input to the armature of said motor under certain operating conditions tending to effect change in wattage input to said armature, said means including a wattmeter type control relay and means under the control of said relay to vary the voltage impressed on the armature of said motor.

4. The combination with a direct current series wound motor for driving winding apparatus or the like, of a regulable electric power source supplying said motor, and means for maintaining substantially constant the wattage input to said motor under operating conditions tending to effect change in wattage input thereto, said means including a wattmeter type control relay and means under the control of said relay for effecting regulation of said power source to vary the voltage impressed on the armature of said motor.

5. The combination with a direct current electric motor for driving winding apparatus or the like, of an adjustable voltage generator supplying power to said motor and generator control means sensitive to changes from a predetermined value in the wattage input of said motor, said means causing said generator to vary the voltage impressed upon the armature of said motor, and said means including means rendering it effective to maintain substantially constant the wattage input to said motor armature.

6. The combination with a direct current series wound motor, of an adjustable voltage generator supplying power to said motor, of generator control means including a wattmeter type relay having its windings in circuit with said motor, said means under the control of said relay controlling said generator to vary the voltage impressed on said motor, thereby to maintain constant the wattage input to said motor under operating conditions tending to vary such input.

7. In a control system for maintaining constant horse-power output of an electric motor, the combination with a direct current motor, of an electric power source supplying said motor, and control means sensitive to changes from a predetermined value in the wattage input of said motor to vary the voltage impressed upon the armature of said motor, said means comprising means rendering it effective to maintain the wattage input to said motor substantially constant.

8. In a control system for maintaining constant horse-power output of an electric motor, the combination with a direct current motor of the series wound type, of an electric power source supplying said motor, and control means sensitive to changes from a predetermined value in the wattage input of said motor to vary the voltage impressed upon the armature of said motor, said means comprising means rendering it effective to maintain the wattage input to said motor substantially constant.

9. In a control system for maintaining constant horse-power output of an electric motor, the combination with a direct current motor of the series wound type, of an adjustable voltage generator supplying power to said motor, and generator control means for maintaining constant the wattage input to said motor under operating conditions tending to vary such input, said means comprising a wattmeter type relay having its windings in circuit with said motor, and means under the control of said relay controlling said generator to vary the voltage impressed on said motor.

JESSE E. JONES.

REFERENCES CITED

The following references are of record in the file of this patent:

UNITED STATES PATENTS

| Number | Name | Date |
| --- | --- | --- |
| 1,461,571 | Alexanderson | July 10, 1923 |
| 2,005,894 | Hellmund et al. | June 25, 1935 |
| 2,179,569 | Young | Nov. 14, 1939 |
| 2,283,662 | Bany | May 19, 1942 |
| 2,339,939 | Michel | Jan. 25, 1944 |